United States Patent Office
3,705,967
Patented Dec. 12, 1972

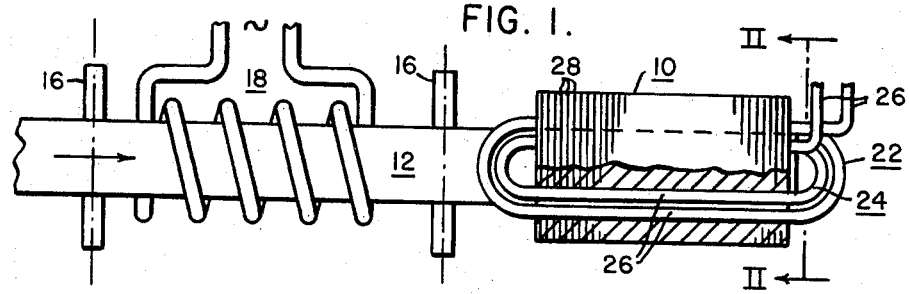
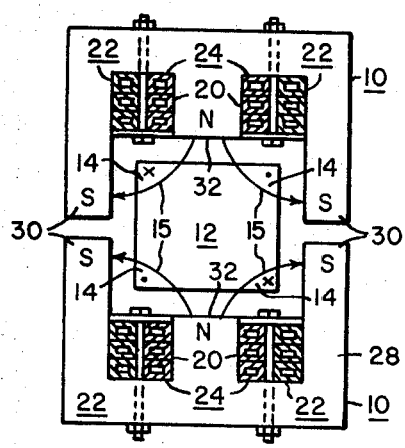
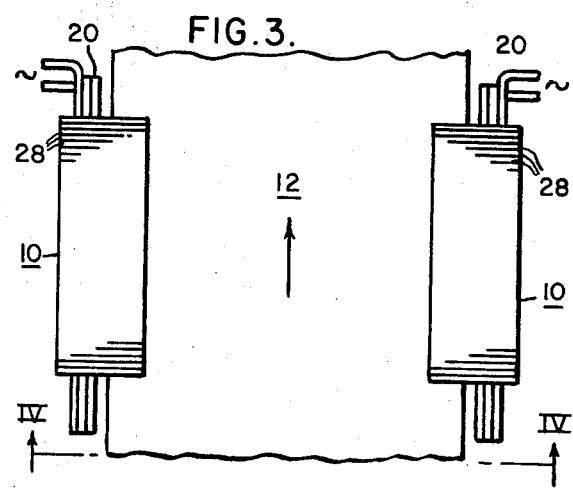
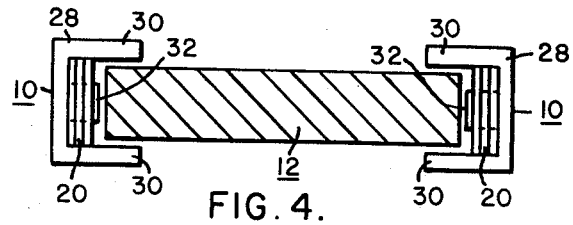
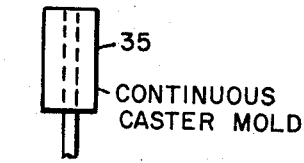
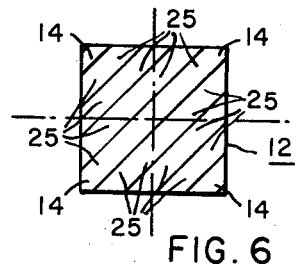
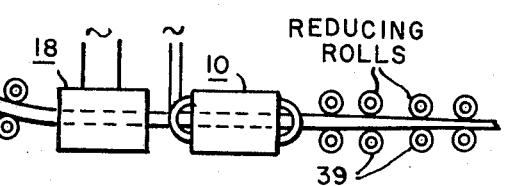

3,705,967
INDUCTION HEATING METHOD
George F. Bobart and William A. Emerson, Ellicott City, Md., assignors to United States Steel Corporation
Continuation-in-part of application Ser. No. 835,951, June 24, 1969, now Patent No. 3,562,470. This application Feb. 8, 1971, Ser. No. 113,255
Int. Cl. H05b 5/00
U.S. Cl. 219—10.41
4 Claims

ABSTRACT OF THE DISCLOSURE

Disclosed herein is an induction heating method for continuous rapid heating of an elongated metal workpiece of rectangular cross-section. A continuous-cast rectangular-section steel strand, while travelling from caster mold to reducing rolls in a continuous caster line, is sequentially passed longitudinally through two types of induction heating means operating in combination to heat the strand flat-center regions and corner regions up to rolling temperature.

---

The present patent application is a continuation-in-part of U.S. patent application Ser. No. 835,951, filed June 24, 1969 (now Pat. No. 3,562,470).

BACKGROUND OF THE INVENTION

Field of the invention

Induction heating method of the continuous type.

Description of the prior art

In continuous heating of an elongated metal workpiece of rectangular cross-section, such as a continuous-cast steel strand travelling from caster mold to reducing rolls, for heating such workpiece up to a temperature such as required for hot rolling of such workpiece, for example, it sometimes happens that certain transverse regions, such as corner regions, along such heated workpiece are or become cooler than other transverse regions, such as the flat-center regions, due to preceding temperature-altering conditions along the line enroute to reducing rolls, such as due to previous subjection to water sprays, for example, as employed in a continuous caster line to assure solidification of at least an outer shell portion of the workpiece. Temperature-deficient regions can introduce undesirable rolling conditions and where the continuous heating of the workpiece is desired to be performed rapidly, an inherent desirable capability of induction heating that enables a relatively short heating facility length, there tends to be inadequate time for temperature equalization by thermal flow from one workpiece region to the other, and at the same time, the different-temperature regions of the workpiece presents a non-uniform heat load that can create a problem with respect to obtaining rapid heating to a uniform temperature.

SUMMARY OF THE INVENTION

The continuous induction heating method of the present invention offers a highly desirable solution to the aforementioned different-temperature-region problem. By use of such method for reheating a rectangular strand in a continuous caster line enroute to reducing rolls, for example, the opportunity is afforded for accurate, rapid, and effective continuous heating of the different transverse regions of the workpiece selectively, in cognizance of any existent or anticipated temperature deficiency in such as the corner regions. By use of helical-coil tunnel-type induction heating means for the workpiece in general including its flat-center regions and laminated-core induction heating means specifically for workpiece corner regions, the present invention affords opportunity for rapid and effective regulation of the cross-sectional distribution of heat produced in such an elongated rectangular-cross-section workpiece.

BRIEF DESCRIPTION OF THE DRAWING

FIG. 1 is a simplified representation in plan view of a pair of induction heating devices suitable for carrying out the method of the present invention;

FIG. 2 is an elevation view of an induction corner-heating device shown in FIG. 1, taken along the line II—II;

FIGS. 3 and 4 are plan and elevation views, respectively, of an alternate arrangement of the exemplified corner-heating device suitable for use in performing the method of the present invention to heat a relatively wide elongated rectangular-cross-section workpiece in a continuous line;

FIG. 5 is a simplified showing of a continuous casting line in which the invention may be employed to advantage for reheat of a continuous-cast workpiece prior to entry into reducing rolls in such line; and FIG. 6 is a showing of typical different-temperature cross-sectional regions of a strand of continuous-cast steel while traveling in line from caster mold to reducing rolls.

DESCRIPTION OF A PREFERRED EMBODIMENT

Referring to FIGS. 1 and 2 in the drawing, an exemplification of an induction corner heating device 10 is shown associated with an elongated workpiece 12 of square cross section to simultaneously heat the four corner regions 14 of such workpiece while travelling longitudinally along rollers 16 in a continuous line which includes one or more helical-coil induction heating devices 18 through which such workpiece also travels to generally heat the workpiece including the flat-center regions 25 (FIG. 6) of the workpiece between the corner regions 14.

Suitable for employment in the method of the present invention, as shown in FIGS. 1 and 2, an induction corner-heating device 10 may comprise two sets 20 of elongated straight-sided water-cooled induction coils 22, 24 extending along and parallel to the upper and lower flat faces of the workpiece 12 and formed by a number of turns of rectangular cross-section copper tubing; one coil 22 encircling the other coil 24. The two coils can be connected in series, and energized via leads 26 from an A.C. power source at such as line frequency of 60 Hz, for example, as suited for a workpiece having non-ferrous magnetic properties, steel at above Curie temperature (1425° F), for example, and dimensions measured in inches, for example.

The elongated side leg portion 26, of the induction coils 22 and 24, in extending along the corner regions 14 of the workpiece 12 creates magnetic flux lines that are directed transversely of such corner regions and thereby induce longitudinal heating currents therein.

To concentrate, direct and focus such magnetic flux lines diagonally across such corner regions 14 as indicated by arrows 15 in FIG. 2, and hence also enhance the efficiency of such coils 22 and 24, the corner-heating means 10 comprises registering stacks of steel laminations 28 in which such coils are nested and secured. As exemplified, each of such laminations may be E-shaped in broad-face view, to accept the side leg portions 26 of the coils in the parallel elongated recesses formed by such configuration when the laminations are stacked together. At the same time, the lamination stacks are so constructed and arranged that each stack includes pole portions 30 of one polarity at its opposite sides that project transversely of the workpiece at its opposite sides, for cooperation with the centrally projecting opposite pole portion 32 of the lamination stack encircled by the coils, to provide flux pole pieces for directing the magnetic flux diagonally across the corner regions 14 of the workpiece. Also, by virtue of use of these, or other suitably-shaped lamination arrays, the magnetic coupling distance with the workpiece is considerably less critical than were induction heating coils alone employed, so that a range of workpiece sizes may be accommodated by a single corner-heating installation, as well as variance in lateral positioning within a given installation, without significant alteration of heating effect.

Where relatively wide elongated workpieces of rectangular cross section are accommodated, an arrangement such as shown in FIGS. 3 and 4 may serve to provide corner heating; two corner heating devices 10 being disposed at opposite side edges of the wide workpiece and each spanning such workpiece thicknesswise.

Referring to FIG. 5, a typical continuous-casting installation in which the method of the present invention can be employed to advantage includes an open-ended water-cooled mold 35, a plurality of water sprays 36 below the mold, power-driven pinch rolls 37 below the sprays, and bending rolls 38 below the pinch rolls. A partially solidified workpiece 12 emerges continuously from mold 35 and is further solidified as it descends through sprays 36. The pinch rolls 37 control the travel of the workpiece, either restraining its descent or propelling it in different phases of the operation. The workpiece 12 next travels through the bending rolls 38, which changes its direction of travel from vertical to horizontal. Normally the longitudinal portion of the workpiece 12 entering the bending rolls still has a liquid core. The longitudinal portion leaving the bending rolls has solidified throughout, but its surface has cooled too much to permit it to be hot-rolled. The corner regions, of the workpiece usually are considerably cooler than the flat-center regions. In one example, the flat-center faces may be at a temperature of about 1700° F., but the corner regions may be several hundred degrees cooler than these side faces. The workpiece must have a reasonably uniform surface temperature and preferably be within the range of about 2350 to 2500° F. to be hot-rolled. The hot-rolling operation is performed in stands of reducing rolls 39 indicated diagrammatically at 39 in FIG. 5.

In passing the workpiece 12 longitudinally through the conventional helical-coil tunnel-type induction heating means 18 operated at 60 Hz. line frequency, for example, the workpiece become generally heated up to the desired hot rolling temperature, in complement to the heating effect of the heating device 10.

By the combined use of the two types of induction heating means of the present invention, independent control of the temperature realized in the several different transverse sectional regions of the workpiece 12 can be obtained, to result in such as uniform heating of the corner and flat-center regions 14 and 25 of a continuous-cast strand up to a desired hot rolling temperature while travelling in a continuous caster line. Due to the nature of the corner-temperature-deficient induction heating load imposed by such continuous-cast strand 12 as presented to be heated, the distribution of the current induced by the helical-coil tunnel-type heating means 18 in the strand during relatively short time spans involved in rapid travel of a given longitudinal strand section through such heating means, a matter of a minute or less, for example, such heating means 18 along can fail to provide heat in the corner regions 14 adequate to bring such regions up to the same temperature to which the flat-center regions 15 become heated within the time span involved, so that the supplemental discrete heating of the corner regions 10. The combination of use of the two types of heating means 18 and 10, thus enables at least more uniform heating at high line speeds with relatively short heating installation lengths, as well as opportunity for independent control of temperature of the corner regions, particularly where a temperature higher than the flat-center region temperature may be desired.

We claim:
1. A method of heating an elongated workpiece of rectangular cross section to a temperature for hot-rolling;
said workpiece initially having a non-uniform elevated temperature pattern over its cross section with its surface regions cooler than its core, and the corner regions of its surface cooler than the four flat faces therebetween;
said method comprising relatively moving said workpiece through a pair of induction heating means spaced apart in the direction of relative movement;
one of said heating means operating to heat the workpiece generally to hot-rolling temperature, but ineffective to heat the corner regions to a temperature as high as the flat faces are heated;
the other of said heating means operating to heat the corner regions to a temperature approaching that to which the flat faces are heated by said first-named heating means.

2. A method as defined in claim 1 in which said workpiece is formed in a continuous-casting operation, and enters said pair of heating means directly following said operation, and is hot-rolled directly following the heating operation.

3. In a series of operations in which a metal workpiece of rectangular cross section is formed by continuous casting and solidified throughout;
the solidified workpiece has a non-uniform elevated temperature pattern over its cross section with its surface regions cooler than its core and the corner regions of its surface cooler than the four flat faces therebetween;
the workpiece is reheated to provide a surface temperature in the hot-rolling range throughout; and
the workpiece is hot-rolled directly following the reheating operation;
an improved method of conducting the reheating operation, which method comprises moving the workpiece through a pair of induction heating means spaced apart in the direction of movement of the workpiece;
one of said heating means operating to heat the workpiece generally to hot-rolling temperature, but ineffective to heat the corner regions to a temperature as high as the flat faces are heated;
the other of said heating means operating to heat the corner regions to a temperature approaching that to which the flat faces are heated by said first-named heating means.

4. A method as defined in claim 3 in which said workpiece is steel, and immediately prior to the reheating operation is at a temperature above Curie temperature throughout its cross section and with the corner regions at a temperature at least 100° F. below the flat faces between the corners; and
said induction heating means are operated by electrical energy at line frequency, impart their heating effect to an elemental length of said workpiece in less than two minutes, and operate to heat the corner regions to at least within 50° F. of the flat faces.

References Cited
UNITED STATES PATENTS

| | | | |
|---|---|---|---|
| 2,902,572 | 9/1959 | Lackner et al. | 219—10.61 X |
| 3,444,346 | 5/1969 | Russell et al. | 219—10.79 X |
| 2,873,344 | 2/1959 | Kocks et al. | 219—10.61 X |

JOSEPH V. TRUHE, Primary Examiner

H. D. JAEGER, Assistant Examiner

U.S. Cl. X.R.

219—10.61